United States Patent
Lin et al.

(10) Patent No.: US 12,262,405 B2
(45) Date of Patent: Mar. 25, 2025

(54) DATA TRANSMISSION METHOD, DATA TRANSMISSION DEVICE, NON-TRANSITORY COMPUTER READABLE MEDIUM, AND CHIP

(71) Applicant: GUANGDONG OPPO MOBILE TELECOMMUNICATIONS CORP., LTD., Guangdong (CN)

(72) Inventors: Huei-Ming Lin, Taiwan (CN); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 392 days.

(21) Appl. No.: 17/736,097

(22) Filed: May 4, 2022

(65) Prior Publication Data
US 2022/0295507 A1 Sep. 15, 2022

Related U.S. Application Data

(63) Continuation of application No. PCT/CN2020/130204, filed on Nov. 19, 2020.

(60) Provisional application No. 62/937,426, filed on Nov. 19, 2019.

(51) Int. Cl.
*H04W 72/56* (2023.01)
*H04W 72/02* (2009.01)
*H04W 72/0446* (2023.01)
*H04W 72/20* (2023.01)

(52) U.S. Cl.
CPC .......... *H04W 72/56* (2023.01); *H04W 72/02* (2013.01); *H04W 72/0446* (2013.01); *H04W 72/20* (2023.01)

(58) Field of Classification Search
CPC ..... H04W 72/56; H04W 72/02; H04W 72/20; H04W 72/0446
See application file for complete search history.

(56) References Cited

U.S. PATENT DOCUMENTS

| | | | |
|---|---|---|---|
| 2003/0118242 A1* | 6/2003 | Nakayama | H03M 7/46 382/245 |
| 2010/0027484 A1* | 2/2010 | Imamura | H04W 74/006 370/329 |
| 2013/0064069 A1* | 3/2013 | Huang | H04L 12/437 370/222 |
| 2015/0016550 A1* | 1/2015 | Kim | H04N 19/86 375/240.29 |

(Continued)

FOREIGN PATENT DOCUMENTS

| | | |
|---|---|---|
| CN | 109391972 | 2/2019 |
| CN | 109526255 | 3/2019 |

(Continued)

OTHER PUBLICATIONS

"Office Action of European Counterpart Application No. 20890216.3", issued on Apr. 24, 2024, pp. 1-9.

(Continued)

*Primary Examiner* — Christine Ng
(74) *Attorney, Agent, or Firm* — JCIP GLOBAL INC.

(57) ABSTRACT

A data transmission method, a data transmission device, non-transitory computer readable medium, and a chip for sidelink communication.

16 Claims, 1 Drawing Sheet

(56) References Cited

U.S. PATENT DOCUMENTS

| | | | | |
|---|---|---|---|---|
| 2018/0206260 | A1* | 7/2018 | Khoryaev | H04W 72/56 |
| 2020/0029245 | A1* | 1/2020 | Khoryeav et al. | H04W 28/08 370/329 |
| 2020/0305191 | A1* | 9/2020 | Moon | H04W 72/23 |
| 2021/0045089 | A1* | 2/2021 | Yu | H04W 74/0808 |
| 2021/0136730 | A1* | 5/2021 | Kim | H04L 5/0051 |
| 2022/0110134 | A1* | 4/2022 | Wang | H04W 72/56 |
| 2022/0191847 | A1* | 6/2022 | Hong | H04W 72/02 |
| 2022/0418036 | A1* | 12/2022 | Back | H04W 52/0216 |
| 2023/0156775 | A1* | 5/2023 | Xing | H04W 72/02 370/329 |
| 2023/0199811 | A1* | 6/2023 | Liang | H04W 72/51 370/329 |

FOREIGN PATENT DOCUMENTS

| | | |
|---|---|---|
| WO | 2018164476 | 9/2018 |
| WO | 2018174630 | 9/2018 |

OTHER PUBLICATIONS

ZTE, Sanechips, "Discussion on QoS management", 3GPP TSG RAN WG1 #98bis R1-1910300, Oct. 2019, pp. 1-3.

Sharp, "Discussion on priority value in LTE V2X", 3GPP TSG RAN WG2 Meeting #107bis R2-1912450, Oct. 2019, pp. 1-5.

3GPP, "14 UE procedures related to Sidelink ", 3rd Generation Partnership Project; Technical Specification Group Radio Access Network; Evolved Universal Terrestrial Radio Access (E-UTRA); Physical layer procedures (Release 15),3GPP TS 36.213 V.15.7.0, Sep. 2019, pp. 1-57.

Huawei, Hisilicon, "Procedure for P-UE partial sensing", 3GPP TSG RAN WG1 Meeting #87 R1-1611192, Nov. 2016, pp. 1-5.

"Search Report of Europe Counterpart Application No. 20890216.3", issued on Oct. 13, 2022, pp. 1-12.

"Office Action of Japan Counterpart Application, Application No. 2022-527849", with English translation thereof, issued on Oct. 29, 2024, p. 1-p. 4.

"Notice of Allowance of Japan Counterpart Application, Application No. 2022-527849", with English translation thereof, issued on Dec. 17, 2024, p. 1-p. 4.

CATT, "Correction and Clarification to TS 36.331", 3GPP TSG-RAN WG2 Meeting #97, Feb. 2017, pp. 1-2.

"International Search Report (Form PCT/ISA/210) of PCT/CN2020/130204," mailed on Feb. 20, 2021, pp. 1-2.

"Written Opinion of The International Searching Authority (Form PCT/ISA/237) of PCT/CN2020/130204," mailed on Feb. 20, 2021, pp. 1-3.

* cited by examiner

DATA TRANSMISSION METHOD, DATA TRANSMISSION DEVICE, NON-TRANSITORY COMPUTER READABLE MEDIUM, AND CHIP

CROSS-REFERENCE TO RELATED APPLICATION

This application is a continuation of international application of PCT application serial no. PCT/CN2020/130204 filed on Nov. 19, 2020, which claims the priority benefit of U.S. application No. 62/937,426 filed on Nov. 19, 2019. The entirety of each of the above mentioned patent applications is hereby incorporated by reference herein and made a part of this specification.

TECHNICAL FIELD

The present disclosure relates to communication technology, in particular to a sidelink communication.

BACKGROUND

The statements in this section merely provide information related to the present disclosure and may not constitute prior art. Further, the content in this section may be used to define a concept related to the invention.

During the development of long-term evolution—vehicle-to-everything (LTE-V2X) communication, two sidelink resource selection modes are supported, namely mode 3 for network scheduled and mode 4 for UE autonomous selection.

In order to avoid multiple UEs selecting same or overlapping sidelink resources for transmissions and causing collisions, it is necessary for a transmitting UE to first perform resource sensing to identify already reserved resources by other UEs before selecting unused/unoccupied resources for its own transmission.

SUMMARY

A data transmission method, a data transmission device, a non-transitory computer readable medium, and a chip for sidelink communication.

BRIEF DESCRIPTION OF THE DRAWINGS

The drawings are used merely for illustration purposes but not for limiting the invention.

DETAILED DESCRIPTION

Figure 1:
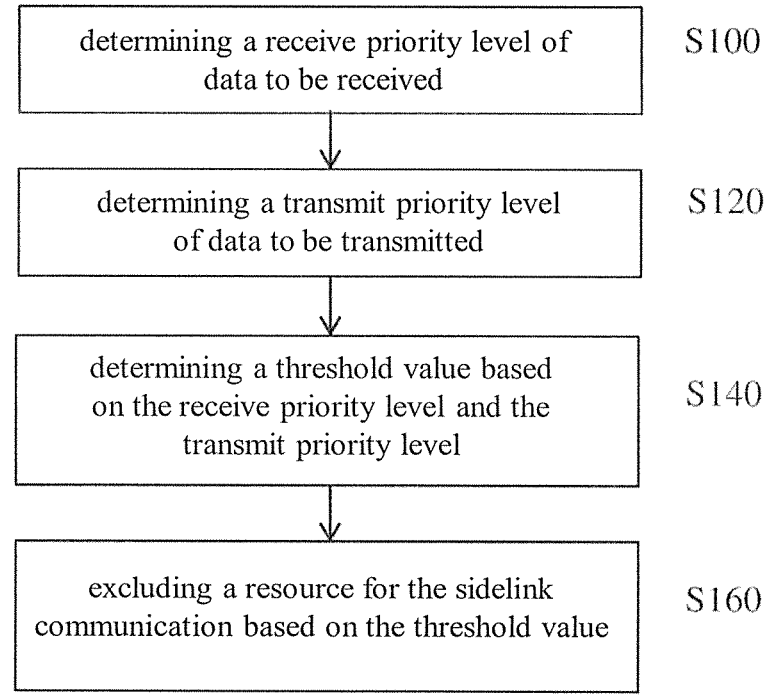
FIG. 1 shows a flow chart of a method.

According to various embodiments, method for sidelink priority threshold selection in LTE V2X communication may be provided, for example to vehicles (for example cars) and user devices (smartphones) equipped with 3GPP Release 15 or beyond 4G LTE-V2X and 5G NR-V2X capable communication modem chipset.

According to LTE sidelink mode 4 resource selection procedure, the UE may first identify reserved resources by decoding sidelink control information (SCI) transmitted from other UEs and measure physical sidelink shared channel (PSSCH) reference signal received power (RSRP) in the associated data resources. If the measured PSSCH RSRP level is above a certain threshold level, the UE may consider the associated sidelink resources are not available for selection. That is, they should be excluded from a candidate resource set for selection. Likewise, if the measured PSSCH RSRP is below the threshold level (e.g. due to far away distance), the UE considered the reserved resources are available for selection. The PSSCH RSRP threshold may be defined as a function of transmission message priority level and reception message priority level. There are 8 levels of sensing priority defined for LTE-V2X messages as sensingPriority=Integer (1 . . . 8). Considering 8 levels of priority for the message to be transmitted and also 8 levels of priority for the received message, there are in total 64 possible different priority combinations, so there are 64 different threshold levels for each transmission and reception message priority pairs. These threshold levels may be (pre-)configurable and they are represented in 3GPP TS36.331 and TS38.331 as an information element, SL-ThresPSSCH-RSRP-List. According to various embodiments, the exact PSSCH RSRP threshold level that should be used for the purpose of resource exclusion may be derived.

According to various embodiments, in order for an LTE sidelink mode 4 UE or an NR sidelink mode 2 UE to correctly select a right threshold among the configured set of thresholds (SL-ThresPSSCH-RSRP-List) to determine if a reserved sidelink resource should be excluded from a candidate resource set based on corresponding transmission and reception priorities, the priority threshold selection equation may be defined as $i=(a-1)*8+b$, wherein a is the priority of message to be transmitted and b is the priority of message received. As such, the i-th SL-ThresPSSCH-RSRP field in the SL-ThresPSSCH-RSRP-List may have a current value range between $((1-1)*8+1)=1$ and $((8-1)*8+8)=64$, which may point to the full range of the SL-ThresPSSCH-RSRP-List as specified. Therefore, the UE may then select a correct and appropriate threshold levels that corresponds to the right Tx and Rx message priorities during the resource exclusion and selection procedure.

According to various embodiments, to resolve the issue of erroneous derivation of PSSCH RSRP thresholds ($Th_{prio_{TX},prio_{RX}}$), the priority threshold selection equation may be defined to $i=(a-1)*8+b$.

As such, the i-th SL-ThresPSSCH-RSRP field in the SL-ThresPSSCH-RSRP-List may have a current value range between $((1-1)*8+1)=1$ and $((8-1)*8+8)=64$, which may point to the full range of the SL-ThresPSSCH-RSRP-List as it was intended.

Therefore, the UE may then select a correct and appropriate threshold levels that corresponds to the right Tx and Rx message priorities during the resource exclusion and selection procedure.

Consequently, the UE may not suffer from not finding suitable resources to transmit its messages and its V2X communication performance is expected to improve.

Furthermore, this definition of priority threshold selection equation may apply to the cases when partial sensing is configured and partial sensing is not configured by higher layers.

The methods and devices according to various embodiments may be applied to TS 36.213 v16.2.0 (2020-06) for LTE V2X as will be described in the following.

According to various embodiments, a UE procedure for determining the subset of resources to be reported to higher layers in PSSCH resource selection in LTE sidelink transmission mode 4 and in sensing measurement in LTE sidelink transmission mode 3 may be provided as follows.

In LTE sidelink transmission mode 4, when requested by higher layers in subframe n for a carrier, the UE may determine the set of resources to be reported to higher layers for PSSCH transmission according to the steps described herein. Parameter $L_{subCH}$ may be the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers, for example by the medium access control (MAC) layer whenever there is SL data available for transmission.

The number of subframes in one set of the time and frequency resources for transmission opportunities of PSSCH is given by $C_{resel}$ and it may be determined by 10*SL_RESOURCE_RESELECTION_COUNTER, where SL_RESOURCE_RESELECTION_COUNTER if configured, else $C_{resel}$ is set to 1.

In sidelink transmission mode 3, when requested by higher layers in subframe n for a carrier, the UE may determine the set of resources to be reported to higher layers in sensing measurement according to the steps described herein. Parameters $L_{subCH}$, $P_{rsvp\_TX}$ and $prio_{TX}$ may be provided by higher layers (e.g. the MAC layer).

$C_{resel}$ is determined by $C_{resel}$=10*SL_RESOURCE_RESELECTION_COUNTER, where SL_RESOURCE_RESELECTION_COUNTER is provided by higher layers (e.g. the MAC layer).

If partial sensing is not configured by higher layers then the following steps may be used:

1) A candidate single-subframe resource for PSSCH transmission $R_{x,y}$ may be defined as a set of $L_{subCH}$ contiguous sub-channels with sub-channel x+j in subframe $t_y^{SL}$ where j=0, . . . , $L_{subCH}$−1. The UE may assume that any set of $L_{subCH}$ contiguous sub-channels included in the corresponding PSSCH resource pool, which is a collection of time and frequency resources for PSSCH transmission, within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ may fulfil the latency requirement. The total number of the candidate single-subframe resources may be denoted by $M_{total}$.

2) The UE may monitor subframes $t_{n'-10 \times P_{step}}^{SL}$, $t_{n'-10 \times P_{step}+1}^{SL}$, . . . , $t_{n'-1}^{SL}$ except for those in which its transmissions occur, where $t_n^{SL}$=n if subframe n belongs to the set ($t_0^{SL}, t_1^{SL}, \ldots, t_{T_{max}}^{SL}$), otherwise subframe $t_n^{SL}$ is the first subframe after subframe n belonging to the set ($t_0^{SL}, t_1^{SL}, \ldots, t_{T_{max}}^{SL}$). The UE may perform the behaviour in the following steps based on PSCCH decoded and S-RSSI measured in these subframes.

3) The parameter $Th_{a,b}$ may be set to the value indicated by the i-th SL-ThresPSSCH-RSRP field in SL-ThresPSSCH-RSRP-List where i=(a−1)*8+b.

4) The set $S_A$ may be initialized to the union of all the candidate single-subframe resources. The set $S_B$ is initialized to an empty set.

5) The UE may exclude any candidate single-subframe resource $R_{x,y}$ from the set $S_A$ if A it meets all the following conditions:

the UE has not monitored subframe $t_z^{SL}$ in Step 2.

there is an integer j which meets y+j×$P_{rsvp\_TX}'$=z+$P_{step}$×k×q where j=0, 1, . . . , $C_{resel}$−1, $P_{rsvp\_TX}'=P_{step} \times P_{rsvp\_TX}/100$, k is any value allowed by the higher layer parameter restrictResourceReservationPeriod and q=1, 2, . . . , Q. Here, $$Q = \frac{1}{k}$$

if k<1 and n'−z≤$P_{step}$×k, where $t_n^{SL}$=n if subframe n belongs to the set $t_0^{SL}, t_1^{SL}, \ldots, t_{T_{max}}^{SL}$, otherwise subframe $t_n^{SL}$ is the first subframe belonging to the set $t_0^{SL}, t_1^{SL}, \ldots, t_{T_{max}}^{SL}$ after subframe n; and Q=1 otherwise.

6) The UE may exclude any candidate single-subframe resource $R_{x,y}$ from the set $S_A$ if A it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively. The resource reservation field with a value $P_{rsvp\_RX}$ may indicate the time periodicity (e.g. milli-second) in which the indicated resources are reserved by the received SCI. The priority field with a value $prio_{RX}$ may indicate the priority level (from 1 to 8) of the SL message received.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P'_{rsvp\_TX}}$ for q=1, 2, . . . , Q and j=0, 1, . . . , $C_{resel}$−1. Here, $$Q = \frac{1}{P_{rsvp\_RX}}$$

if $P_{rsvp\_RX}$<1 and n'−m≤$P_{step} \times P_{rsvp\_RX}$, where $t_n^{SL}$=n if subframe n belongs to the set ($t_0^{SL}, t_1^{SL}, \ldots, t_{T_{max}}^{SL}$), otherwise subframe $t_n^{SL}$ is the first subframe after subframe n belonging to the set ($t_0^{SL}, t_1^{SL}, \ldots, t_{T_{max}}^{SL}$); otherwise Q=1.

If partial sensing is configured by higher layers then the following steps are used:

1) A candidate single-subframe resource for PSSCH transmission $R_{x,y}$ may be defined as a set of $L_{subCH}$ contiguous sub-channels with sub-channel x+j in subframe $t_y^{SL}$ where j=0, . . . , $L_{subCH}$−1. The UE may determine by its implementation a set of subframes which consists of at least Y subframes within the time interval [n+$T_1$, n+$T_2$] where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ may fulfil the latency requirement and Y may be greater than or equal to the high layer parameter minNumCandidateSF. The UE may assume that any set of $L_{subCH}$ contiguous sub-channels included in the corresponding PSSCH resource pool, which is a collection of time and frequency resources for PSSCH transmission, within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE may monitor any subframe $t_{y-k \times P_{step}}^{SL}$ if k-th bit of the high layer parameter gapCandidateSensing is set to 1. The UE may perform the behaviour in the following steps based on PSCCH decoded and S-RSSI measured in these subframes.

3) The parameter $Th_{a,b}$ may be set to the value indicated by the i-th SL-ThresPSSCH-RSRP field in SL-ThresPSSCH-RSRP-List where i=(a−1)*8+b.

4) The set $S_A$ may be initialized to the union of all the candidate single-subframe resources. The set $S_B$ may be initialized to an empty set.

5) The UE may exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively. The resource reservation field with a value $P_{rsvp\_RX}$ may indicate the time periodicity (e.g. milli-second) in which the indicated resources are reserved by the received SCI. The priority field with a value $prio_{Rx}$ may indicate the priority level (from 1 to 8) of the SL message received.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+q \times P_{step} \times P_{rsvp\_RX}}^{SL}$ determines the set of resource blocks and subframes which overlaps with $R_{x,y+j \times P'_{rsvp\_TX}}$ for $q=1, 2, \ldots, Q$ and $j=0, 1, \ldots, C_{resel}-1$. Here, $$Q = \frac{1}{P_{rsvp\_RX}}$$

if $P_{rsvp\_RX} < 1$ and $y'-m \leq P_{step} \times P_{rsvp\_RX} + P_{step}$, where $t_y^{SL}$ is the last subframe of the Y subframes, and Q=1 otherwise.

The methods and devices according to various embodiments may be applied to TS 38.214 v16.2.0 (2020-06) or TS 38.214 v16.3.0 (2020-09) for NR sidelink as will be described in the following.

According to various embodiments, a UE procedure for determining the subset of resources to be reported to higher layers in PSSCH/PSCCH resource selection in NR sidelink resource allocation mode 2 may be provided as follows.

In NR sidelink resource allocation mode 2, the higher layer may request the UE to determine a subset of resources from which the higher layer may select resources for PSSCH/PSCCH transmission. To trigger this procedure, in slot n, the higher layer may provide the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of ms.

if the higher layer requests the UE to determine a subset of resources from which the higher layer may select resources for PSSCH/PSCCH transmission as part of re-evaluation or pre-emption procedure, the higher layer may provide a set of resources ($r_0, r_1, r_2, \ldots$) which may be subject to re-evaluation and a set of resources ($r_0', r_1', r_2', \ldots$) which may be subject to pre-emption.

It may be up to UE implementation to determine the subset of resources as requested by higher layers before or after the slot $r_i''-T_3$, where $r_i''$ is the slot with the smallest slot index among ($r_0, r_1, r_2, \ldots$) and ($r_0', r_1', r_2', \ldots$), and $T_3$ is equal to $T_{proc,1}^{SL}$, where $T_{proc,1}^{SL}$ is defined in slots representing the time allowed for preparation of PSSCH/PSCCH in a given subcarrier spacing.

The following higher layer parameters affect this procedure:

sl-SelectionWindowList: internal parameter $T_{2min}$ may be set to the corresponding value from higher layer parameter sl-SelectionWindowList for the given value of $prio_{TX}$;

sl-ThresPSSCH-RSRP-List: this higher layer parameter may provide an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$;

sl-RS-ForSensing may select if the UE uses the PSSCH-RSRP or PSCCH-RSRP measurement;

sl-ResourceReservePeriodList-r16;

sl-SensingWindow: internal parameter $T_0$ may be defined as the number of slots corresponding to sl-SensingWindow ms;

sl-TxPercentageList: internal parameter X for a given $prio_{TX}$ may be defined as si-TxPercentageList ($prio_{TX}$) converted from percentage to ratio;

sl-PreemptionEnable: if sl-PreemptionEnable-r16 may be provided, and if it is not equal to 'enabled', internal parameter $prio_{pre}$ may be set to the higher layer provided parameter sl-PreemptionEnable.

The resource reservation interval, $P_{rsvp\_TX}$, if provided, may be converted from units of ms to units of logical slots, resulting in $P_{rsvp\_TX}'$.

($t_0^{SL}, t_1^{SL}, t_2^{SL}, \ldots$) may denote the set of slots which can belong to a sidelink resource pool.

The following steps may be used:

1) A candidate single-slot resource for transmission $R_{x,y}$ may be defined as a set of $L_{subCH}$ contiguous sub-channels with sub-channel x+j in slot $t_y^{SL}$ where $j=0, \ldots, L_{subCH}-1$. The UE shall assume that any set of $L_{subCH}$ contiguous sub-channels included in the corresponding resource pool within the time interval [n+$T_1$, n+$T_2$] correspond to one candidate single-slot resource, where selection of $T_1$ is up to UE implementation under $0 \leq T_1 \leq T_{proc,1}^{SL}$, where $T_{proc,1}^{SL}$ is defined in slots in Table 8.1.4-2 (of TS 38.214) where $\mu_{SL}$ is the SCS configuration of the SL BWP;

if $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the remaining packet delay budget (in slots). The total number of candidate single-slot resources may be denoted by $M_{total}$.

2) The sensing window may be defined by the range of slots [n−$T_0$, n−$T_{proc,0}^{SL}$) where $T_0$ is defined above and $T_{proc,0}^{SL}$ is defined in slots representing the time allowed for the UE to finalize its sensing operation before resource selection trigger in slot n. The UE may monitor slots which can belong to a sidelink resource pool within the sensing window except for those in which its own transmissions occur. The UE may perform the behaviour in the following steps based on PSCCH decoded and RSRP measured in these slots.

3) The internal parameter Th($p_i$, $p_j$) may be set to the corresponding value of RSRP threshold indicated by the i-th field in sl-ThresPSSCH-RSRP-List-r16, where $i = p_i + (p_j-1)*8$.

4) The set $S_A$ may be initialized to the set of all the candidate single-slot resources.

5) The UE may exclude any candidate single-slot resource $R_{x,y}$ from the set $S_A$ if it meets all the following conditions: the UE has not monitored slot $t_m^{SL}$ in Step 2.

for any periodicity value allowed by the higher layer parameter sl-ResourceReservePeriodList-r16 and a hypothetical SCI format 1-A received in slot $t_m^{SL}$ with "Resource reservation period" field set to that periodicity value and indicating all subchannels of the resource pool in this slot, condition c in step 6 would be met.

6) The UE may exclude any candidate single-slot resource $R_{x,y}$ from the set $S_A$ if it meets all the following conditions:
a) the UE receives an SCI format 1-A in slot $t_m^{SL}$, and "Resource reservation period" field, if present, and "Priority" field in the received SCI format 1-A indicate the values $P_{rsvp\_RX}$ and $prio_{RX}$, respectively. The resource reservation field with a value $P_{rsvp\_RX}$ may indicate the time periodicity (e.g. milli-second) in which the indicated resources are reserved by the received SCI. The priority field with a value $prio_{RX}$ may indicate the priority level (from 1 to 8) of the SL message received.
b) the RSRP measurement performed, for the received SCI format 1-A, is higher than $Th(prio_{RX}, prio_{TX})$;
c) the SCI format received in slot $t_m^{SL}$ or the same SCI format which, if and only if the "Resource reservation period" field is present in the received SCI format 1-A, is assumed to be received in slot(s) $t_{m+q \times P'_{rsvp\_RX}}^{SL}$ determines the set of resource blocks and slots which overlaps with $R_{x,y+j \times P'_{rsvp\_Tx}}$ for q=1, 2, . . . , Q and j=0, 1, . . . , $C_{resel}$−1. Here, $P'_{rsvp\_RX}$ is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and n'−m≤$P'_{rsvp\_RX}$, where $t_n^{SL}$=n if slot n belongs to the set $(t_0^{SL}, t_1^{SL}, \ldots, t_{T_{max}}^{SL})$, otherwise slot $t_{n'}^{SL}$ is the first slot after slot n belonging to the set $(t_0^{SL}, t_1^{SL}, \ldots, t_{T_{max}}^{SL})$; otherwise Q=1. $T_{scal}$ may be set to selection window size $T_2$ converted to units of ms.

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The methods and devices as described herein may be applied to 4G standard (TS 36.213) for LTE sidelink. Likewise, the methods and devices as described herein may be applied to 5G standard (TS 38.214) for NR sidelink. Likewise, the methods and devices as described herein may be applied to 5G standard (TS 38.214 v16.2.0 2020-06 or TS 38.214 v16.3.0 2020-09).

As described above, in order to resolve the existing problem of erroneous derivation of PS SCH RSRP thresholds ($Th_{prio_{TX}, prio_{RX}}$) and causing the UE to use threshold levels that are too high, and thus finding less number of available candidate resources to select from, the priority threshold selection equation may be defined to i=(a−1)*8+b.

FIG. 1 shows a flow diagram illustrating a data transmission method performed by a device, wherein the device is configured for sidelink communication. At S100, a receive priority level of data to be received may be determined. At S120, a transmit priority level of data to be transmitted may be determined. At S140, a threshold value may be determined (for example based on the receive priority level and the transmit priority level). However, it will be understood that the threshold value may be determined based on any other mechanism. At S160, a resource may be excluded for the sidelink communication based on the threshold value.

According to various embodiments, the receive priority level and/or the transmit priority level may be provided to the device by a higher communication layer.

According to various embodiments, the receive priority level and/or the transmit priority level may be provided to the device in a SCI format, for example SCI format 1 or SCI format 1-A. For example, in NR sidelink, the receive priority level is provided in SCI format 1-A. For example in LTE sidelink, the receive priority level is provided in SCI format 1.

According to various embodiments, the threshold value may be determined based on a threshold index.

According to various embodiments, the threshold index, i, may be determined according to the formula i=(a−1)*8+b, wherein a indicates the transmit priority level, and wherein b indicates the receive priority level.

According to various embodiments, the threshold value may be determined based on the threshold index and a table of threshold values.

According to various embodiments, the data transmission method may further include resource sensing to determine a threshold.

According to various embodiments, the data transmission method may further include determining whether to exclude a resource from a list of candidate resources for sidelink communication based on the resource sensing and the threshold.

According to various embodiments, the resource sensing may include or may be sensing in which partial sensing is configured.

According to various embodiments, the resource sensing may include or may be sensing in which partial sensing is not configured.

Figure 2:
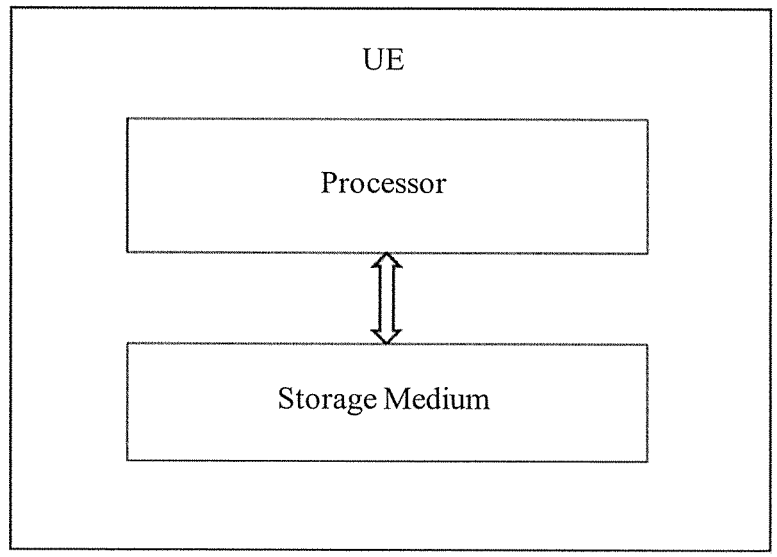
FIG. 2 shows an exemplary UE.

According to various embodiments, the device may include or may be a user equipment (UE), for example as illustrated in FIG. 2, and the sidelink communication may include or may be communication between the user equipment and another user equipment.

According to various embodiments, the sidelink communication may include or may be communication according to 4G for sidelink communication.

According to various embodiments, the sidelink communication may include or may be communication according to 5G for sidelink communication.

According to various embodiments, the sidelink communication may include or may be communication according to NR sidelink mode 2 operation.

According to various embodiments, the sidelink communication may include or may be communication according to LTE sidelink mode 4 operation.

According to various embodiments, the threshold value is determined based on the receive priority level and the transmit priority level.

A device configured to carry out the method as described herein may be provided, for example a UE as shown in FIG. 2.

According to various embodiments, the device may include transmitting means configured to transmit data using sidelink communication; and receiving means configured to receive data using sidelink communication.

According to various embodiments, the device may include one or more processors and one or more memory storing program instructions, the device being configured, when the program instructions are executed by the one or more processors, to carry out the method as described herein.

A computer program containing program instructions which, when executed by one or more processors in a device, cause the device to carry out the method as described herein may be provided.

A carrier (for example a computer readable medium) for carrying the computer program as described herein may be provided.

The following References may be helpful for understanding the present disclosure:

[1] 3GPP TS 38.211 V15.5.0: "NR; Physical channels and modulation"
[2] 3GPP TS 38.212 V15.5.0: "NR; Multiplexing and channel coding"
[3] 3GPP TS 38.213 V15.5.0: "NR; Physical layer procedures for control"
[4] 3GPP TS 38.214 V15.5.0: "NR; Physical layer procedures for data"
[5] 3GPP TS 38.215 V15.5.0: "NR; Physical layer measurements"
[6] 3GPP TS 38.321 V15.5.0: "NR; Medium Access Control (MAC) protocol specification"
[7] 3GPP TS 38.331 V15.5.0: "NR; Radio Resource Control (RRC) protocol specification"

Some of the abbreviations used in this present disclosure are listed below:

| | |
|---|---|
| 3GPP | $3^{rd}$ Generation Partnership Project |
| 5G | $5^{th}$ Generation |
| NR | New Radio |
| RRC | Radio Resource Control |
| MAC | Media Access Control |
| PSSCH | Physical sidelink shared channel |
| PSCCH | Physical sidelink control channel |
| RB | Resource Block |
| RSRP | Reference signal received power |
| SL | Sidelink |
| Tx | Transmission |
| Rx | Receive |

CLAUSES

1. A data transmission method performed by a device, wherein the device is configured for sidelink communication, the method comprising:
   determining a receive priority level of data to be received;
   determining a transmit priority level of data to be transmitted;
   excluding a resource for the sidelink communication based on a threshold value.
2. The data transmission method of clause 1,
   wherein the receive priority level and/or the transmit priority level is provided to the device by a higher communication layer.
3. The data transmission method of at least one of clauses 1 or 2,
   wherein the receive priority level and/or the transmit priority level is provided to the device in a SCI format.
4. The data transmission method of at least one of clauses 1 to 3,
   wherein the threshold value is determined based on a threshold index.
5. The data transmission method of clause 4,
   wherein the threshold index, i, is determined according to the formula $i=(a-1)*8+b$, wherein a indicates the transmit priority level, and wherein b indicates the receive priority level.
6. The data transmission method of at least one of clauses 1 to 5,
   wherein the threshold value is determined based on the threshold index and a table of threshold values.
7. The data transmission method of at least one of clauses 1 to 6, further comprising:
   resource sensing to determine a threshold.
8. The data transmission method of clause 7, further comprising:
   determining whether to exclude a resource from a list of candidate resources for sidelink communication based on the resource sensing and the threshold.
9. The data transmission method of at least one of clauses 7 or 8,
   wherein the resource sensing comprises sensing in which partial sensing is configured.
10. The data transmission method of at least one of clauses 7 or 8,
    wherein the resource sensing comprises sensing in which partial sensing is not configured.
11. The data transmission method of at least one of clauses 1 to 10,
    wherein the device comprises a user equipment (UE), and the sidelink communication comprises communication between the user equipment and another user equipment.
12. The data transmission method of at least one of clauses 1 to 11,
    wherein the sidelink communication comprises communication according to 4G sidelink communication.
13. The data transmission method of at least one of clauses 1 to 12,
    wherein the sidelink communication comprises communication according to 5G sidelink communication.
14. The data transmission method of at least one of clauses 1 to 13,
    wherein the sidelink communication comprises communication according to NR sidelink mode 2 operation.
15. The data transmission method of at least one of clauses 1 to 14,
    wherein the sidelink communication comprises communication according to LTE sidelink mode 4 operation.
16. The data transmission method of at least one of clauses 1 to 15,
    wherein the threshold value is determined based on the receive priority level and the transmit priority level.
17. A data transmission device, wherein the device is configured for sidelink communication, the device comprising:
    a processing module, configured to determine a receive priority level of data to be received, and a transmit priority level of data to be transmitted;
    an excluding module, configured to exclude a resource for the sidelink communication based on a threshold value.
18. The device of clause 17,
    wherein the receive priority level and/or the transmit priority level is provided to the device by a higher communication layer.
19. The device of at least one of clauses 17 or 18,
    wherein the receive priority level and/or the transmit priority level is provided to the device in a SCI format.
20. The device of at least one of clauses 17 to 19,
    wherein the threshold value is determined based on a threshold index.

21. The device of clause 20,
wherein the threshold index, i, is determined according to the formula i=(a−1)*8+b, wherein a indicates the transmit priority level, and wherein b indicates the receive priority level.

22. The device of at least one of clauses 17 to 21,
wherein the threshold value is determined based on the threshold index and a table of threshold values.

23. The device of at least one of clauses 17 to 22, further comprising:
the processing module is configured to perform resource sensing to determine a threshold.

24. The device of clause 23, further comprising:
the processing module is configured to determine whether to exclude a resource from a list of candidate resources for sidelink communication based on the resource sensing and the threshold.

25. The device of at least one of clauses 23 or 24,
wherein the resource sensing comprises sensing in which partial sensing is configured.

26. The device of at least one of clauses 23 or 24,
wherein the resource sensing comprises sensing in which partial sensing is not configured.

27. The device of at least one of clauses 17 to 26,
wherein the device comprises a user equipment (UE), and the sidelink communication comprises communication between the user equipment and another user equipment.

28. The device of at least one of clauses 17 to 27,
wherein the sidelink communication comprises communication according to 4G sidelink communication.

29. The device of at least one of clauses 17 to 28,
wherein the sidelink communication comprises communication according to 5G sidelink communication.

30. The device of at least one of clauses 17 to 29,
wherein the sidelink communication comprises communication according to NR sidelink mode 2 operation.

31. The device of at least one of clauses 17 to 30,
wherein the sidelink communication comprises communication according to LTE sidelink mode 4 operation.

32. The device of at least one of clauses 17 to 31,
wherein the threshold value is determined based on the receive priority level and the transmit priority level.

33. The data transmission apparatus, comprising one or more processors and one or more memory storing program instructions, the device being configured, when the program instructions are executed by the one or more processors, to carry out the method of any one of clauses 1 to 16.

34. A computer program containing program instructions which, when executed by one or more processors in a device, cause the device to carry out the method of any one of clauses 1 to 16.

35. A non-transitory computer-readable medium, comprising instructions executed by a processor to carry out the method of any one of clauses 1 to 16.

36. A chip, comprising one or more processors configured to execute program instructions stored in one or more memory to carry out the method of any one of clauses 1 to 16.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:

1. A data transmission method performed by a device, wherein the device is configured for sidelink communication, the method comprising:
determining a receive priority level of data to be received;
determining a transmit priority level of data to be transmitted;
excluding a resource for the sidelink communication based on a threshold value, wherein the threshold value is determined based on a threshold index, and
the threshold index, i, is determined according to the formula i=(a−1)*8+b. wherein a indicates the transmit priority level, and wherein b indicates the receive priority level.

2. The data transmission method of claim 1, wherein the receive priority level and/or the transmit priority level is provided to the device by a higher communication layer.

3. The data transmission method of claim 1,
wherein the receive priority level and/or the transmit priority level is provided to the device in a SCI format.

4. The data transmission method of claim 1,
wherein the threshold value is determined based on the threshold index and a table of threshold values.

5. The data transmission method of claim 1, further comprising:
resource sensing to determine a threshold.

6. The data transmission method of claim 5, further comprising:
determining whether to exclude the resource from a list of candidate resources for sidelink communication based on the resource sensing and the threshold.

7. The data transmission method of claim 5,
wherein the resource sensing comprises sensing in which partial sensing is configured.

8. The data transmission method of claim 5,
wherein the resource sensing comprises sensing in which partial sensing is not configured.

9. A data transmission device, comprising one or more processors configured to execute program instructions stored in one or more memory to cause the data transmission device to carry out the method of claim 1.

10. The device of claim 9,
wherein the receive priority level and/or the transmit priority level is provided to the device by a higher communication layer.

11. The device of claim 9,
wherein the receive priority level and/or the transmit priority level is provided to the device in a SCI format.

12. The device of claim 9,
wherein the threshold value is determined based on a threshold index and a table of threshold values.

13. The device of claim 9, further comprising:
the processor is configured to perform resource sensing to determine a threshold.

14. The device of claim 13, further comprising:
the processor is configured to determine whether to exclude the resource from a list of candidate resources for sidelink communication based on the resource sensing and the threshold.

15. A non-transitory computer-readable medium, storing computer executable instructions for a device, wherein when the instructions are executed, cause the device to carry out the method of claim 1.

16. A chip, comprising one or more processors configured to execute program instructions stored in one or more memory to cause a device installed with the chip to carry out the method of claim 1.

* * * * *